(12) United States Patent
Pfaendner et al.

(10) Patent No.: US 6,369,163 B1
(45) Date of Patent: *Apr. 9, 2002

(54) PYRROLIDINONE-CONTAINING COMPATIBILIZERS

(75) Inventors: Rudolf Pfaendner, Rimbach (DE); Yefim Blyakhman, Bronx, NY (US)

(73) Assignee: Ciba Specialty Chemicals Corporation, Tarrytown, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,269
(22) PCT Filed: Dec. 11, 1995
(86) PCT No.: PCT/EP95/04867
§ 371 Date: Aug. 14, 1997
§ 102(e) Date: Aug. 14, 1997
(87) PCT Pub. No.: WO96/19507
PCT Pub. Date: Jun. 27, 1996

(30) Foreign Application Priority Data

Dec. 22, 1994 (CH) ............................................. 3900-94

(51) Int. Cl.[7] .................. C08L 23/36; C08L 51/06; C08F 255/02
(52) U.S. Cl. ............... 525/283; 525/256; 525/257; 525/259; 525/279; 525/266; 525/293; 525/298; 525/300; 525/286; 525/328.2; 525/329.4; 525/333.7; 525/375; 525/383
(58) Field of Search .................. 524/104; 525/257, 525/283, 286, 375, 383, 259, 266

(56) References Cited

U.S. PATENT DOCUMENTS

| 4,801,400 A | * | 1/1989 | Login et al. |
| 4,847,322 A | * | 7/1989 | Akkapeddi et al. |
| 5,006,621 A | * | 4/1991 | Wahle et al. |
| 5,055,521 A | * | 10/1991 | Parsy et al. |
| 5,061,751 A | * | 10/1991 | Patton |
| 5,268,426 A | * | 12/1993 | Parsy et al. |
| 5,436,297 A | * | 7/1995 | Teraya et al. |
| 5,629,359 A | * | 5/1997 | Peters et al. |
| 5,693,095 A | * | 12/1997 | Freeman et al. |

FOREIGN PATENT DOCUMENTS

| EP | 0295982 | | 12/1988 | |
| EP | 0596654 | | 5/1994 | |
| GB | 910997 | * | 11/1962 | ................. 524/104 |
| JP | 3-168240 | * | 7/1991 | ................. 524/104 |
| WO | 9015101 | | 12/1990 | |

OTHER PUBLICATIONS

"Compatibilizers for Plastics" published in "Recycling and Recovery of Plastics", pp. 315–327.
Hawley's Condensed Chemical Dictionary by Sax et al. Feb. 12, 1991, pp. 1124–1125.*
S. Fuzessery, Recycle, 91, Davos 4.1–4.13.
S. Fuzessery, Recycle, 95, Davos 6–4.3–6–4.9.

* cited by examiner

Primary Examiner—Fred Zitomer
(74) Attorney, Agent, or Firm—Kevin T. Mansfield

(57) ABSTRACT

There is described the use of monomeric and polymeric N-pyrrolidinone-containing compounds as compatibilizers for plastic compositions, a process for improving the compatibility of plastic compositions, the improved plastic compositions obtainable thereby as well as novel polymeric N-pyrrolidinone-containing compounds.

17 Claims, No Drawings

PYRROLIDINONE-CONTAINING COMPATIBILIZERS

The invention relates to the use of monomeric and polymeric N-pyrrolidinone-containing compounds as compatibilisers in plastic compositions, to the improved plastic compositions obtainable thereby as well as to novel polymeric N-pyrrolidinone-containing compounds.

Different plastic materials are usually not miscible, i.e. when two different plastic materials are processed, a macroscopic mixture is obtained which has insufficient mechanical properties. This is not only to be observed in mixtures of nonpolar plastics, e.g. polyethylene, and polar plastics, e.g. polyamide, but also even in the case of e.g. HDPE and LDPE. Such mixtures in the simplest case form a dispersion of the one polymer in the matrix of the other, i.e. a two phase system is obtained. Compatibilisers are polymers which preferably attach themselves to the interface between the polymers involved, or which penetrate into the polymers, thereby improving the adhesion between the polymers involved. The improved connection between matrix and dispersed phase enhances the mechanical properties. In addition, compatibilisers can improve the dispersion of the component and reduce the coagulation of the particles. In some cases, the separation of two-component systems or multicomponent systems can be completely inhibited resulting in a homogeneous blend of different plastic materials which has good mechanical properties.

Compatibilisers are used in virgin plastic compositions, but increasingly also in recyclates. Typical examples are polyethylene/polyamide-coextruded films (PE/PA films), which cannot be separated anymore in simple manner by physical methods. Further examples to be mentioned are PE/PET- and PE/PVC-coextruded films.

The known compatibilisers are mainly based on polymers of polar and nonpolar structure which can be prepared by conventional polymerisation reactions (K. Hausmann, Kunststoffe 1993, (83), 820; G. Obieglo and K. Romer, Kunststoffe, 1993, (83), 926; S. Fuzessery, Recycle 91, D 4.1–D 4.13; K. Hausmann, Kunststoffe 1995, (85), 446–451; S. Fuzessery, Recycle 95, Davos, 6-4.3–6-4.9; R. Mülhaupt et al., Kunststoffe 1994, (84), 1153–1158.

EP-A-0 602 008 discloses poly-N-vinylpyrrolidones as compatibilisers.

There is still a need to provide compatibilisers by means of which the properties of plastic compositions can be improved in simple manner.

This invention solves this task by using N-pyrrolidinone-containing compounds.

Accordingly, the invention relates to the use of 0.5 to 50% by weight of at least one monomeric or polymeric N-pyrrolidinone-containing compound as compatibiliser for plastic compositions, with the proviso that poly-N-vinylpyrrolidones are excluded.

Some of the N-pyrrolidinone-containing compounds used according to this invention are known from the state of the art, while those compounds which are N-pyrrolidinone-containing graft polymers are novel.

One advantage of the present invention is that the compatibility-improving effect is achieved already at low concentrations of monomeric or polymeric N-pyrrolidinone-containing compound.

Monomeric N-pyrrolidinone-containing compounds are preferably those of formula I

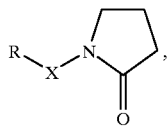
(I)

wherein
X is a direct bond or —OCH$_2$CH$_2$—, where the carbon atom is bound to the nitrogen,
R is

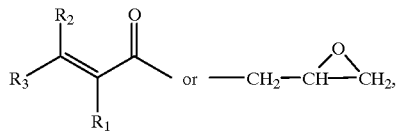

R$_1$ is hydrogen, C$_1$–C$_{18}$alkyl, C$_6$–C$_{14}$aryl, C$_6$–C$_{13}$aryl which is substituted by 1 to 3 phenyl or C$_1$–C$_{18}$alkyl groups; C$_5$–C$_7$cycloalkyl, or C$_5$–C$_7$cycloalkyl which is substituted by 1 to 3 C$_1$–C$_{18}$alkyl groups, R$_2$ is hydrogen, C$_1$–C$_{18}$alkyl, C$_6$–C$_{14}$aryl, C$_6$–C$_{13}$aryl which is substituted by 1 to 3 phenyl or C$_1$–C$_{18}$alkyl groups; C$_5$–C$_7$cycloalkyl, or C$_5$–C$_7$cycloalkyl which is substituted by 1 to 3 C$_1$–C$_{18}$-alkyl groups, and R$_3$ is hydrogen, C$_1$–C$_{18}$alkyl, C$_6$–C$_{14}$aryl, —COOH, C$_6$–C$_{13}$aryl which is substituted by 1 to 3 phenyl or C$_1$–C$_{18}$alkyl groups; C$_5$–C$_7$cycloalkyl, or C$_5$–C$_7$cycloalkyl which is substituted by 1 to 3 C$_1$–C$_{18}$alkyl groups.

Substituents of formula I defined as alkyl of up to 18 carbon atoms are typically radicals such as methyl, ethyl, propyl, butyl, pentyl, hexyl, heptyl, octyl, nonyl, decyl, undecyl, dodecyl, tetradecyl, hexadecyl or octadecyl as well as corresponding branched isomers.

Substituents of formula I defined as C$_5$–C$_7$cycloalkyl or C$_5$–C$_7$cycloalkyl which is substituted by 1 to 3 C$_1$–C$_{18}$alkyl groups are suitably radicals such as cyclopentyl, cyclohexyl, cycloheptyl, methylcyclohexyl, ethylcyclohexyl or ethylcycloheptyl.

Substituents of formula I defined as C$_6$–C$_{14}$aryl or C$_6$–C$_{13}$aryl which is substituted by 1 to 3 phenyl or C$_1$–C$_{18}$alkyl groups are suitably radicals such as phenyl, naphthyl or tert-butylphenyl.

R$_1$ and R$_2$ are preferably hydrogen.

R$_3$ is preferably —COOH; phenyl is unsubstituted or substituted by one C$_1$–C$_{12}$alkyl radical or phenyl radical.

Very particularly preferred compounds of formula I are those, wherein R$_1$ and R$_2$ are hydrogen and R$_3$ is —COOH; phenyl is unsubstituted by one C$_1$–C$_{12}$alkyl radical or phenyl radical.

The polymeric N-pyrrolidinone-containing compounds are derived from the above-described monomeric compounds, i.e. they contain at least one structural unit of monomeric compounds. The polymeric N-pyrrolidinone-containing compounds can be obtained by linking the monomeric compounds via the ethylenically unsaturated bond by a radically initiated graft polymerisation on organic polymers. In addition to their use as compatibilisers, these polymeric compounds constitute, as novel substances, a further object of the invention. It is not necessary that the monomer is chemically bonded to 100%. It suffices, for example, that only part of the monomer is chemically bonded (e.g. 10 to 40%) and that the remaining monomer is still in reactive form. A compatibiliser is then obtained which contains polymerically bonded groups as well as low-molecular components which only react when used in the blend and which become effective after reaction or as low-molecular compound.

The incorporation of the ethylenically unsaturated compounds of formula (I) in polymers is carried out by grafting on organic polymers. Organic polymers are mainly hydrocarbon polymers which can be saturated or unsaturated. Saturated hydrocarbons include the polyolefins, typically polyethylene, polypropylene, polybutene or polyisobutene. Unsaturated hydrocarbons include the diene polymers and their copolymers with olefines, typically poly-butadiene, polyisoprene, propylene/butadiene or ethylene/propylene/ butadiene. It is preferred to graft on polyolefins, in particular on polyethylene and polypropylene.

Besides the cited and preferred polymers, further novel polymeric N-pyrrolidinone-containing compounds are derived from the polymers in the following list:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(II) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/ propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/ methylpentene copolymers, ethylene/heptene copolymers, ethylene/octene copolymers, propylene/ butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/ acrylic acid copolymers and their salts (ionomers) as well as terpolymers of ethylene with propylene and a diene such as hexadiene, dicyclopentadiene or ethylidenenorbornene; and mixtures of such copolymers with one another and with polymers mentioned in 1) above, for example polypropylene/ethylene-propylene copolymers, LDPE/ethylene-vinyl acetate copolymers, LDPE/ ethylene-acrylic acid copolymers, LLDPE/ethylene-vinylacetate copolymers, LLDPE/ethylene-acrylic acid copolymers and alternating or random polyalkylene/ carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/ butadiene/alkyl acrylate, styrene/butadiene/alkyl methacrylate, styrene/maleic anhydride, styrene/ acrylonitrile/methyl acrylate; mixtures of high impact strength of styrene copolymers and another polymer, for example a polyacrylate, a diene polymer or an ethylene/ propylene/diene terpolymer; and block copolymers of styrene such as styrene/butadiene/styrene, styrene/ isoprene/styrene, styrene/ethylene/butylene/styrene or styrene/ethylene/propylene/ styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Polymers derived from ($\alpha$,$\beta$-unsaturated acids and derivatives thereof such as polyacrylates and polymethacrylates; polymethyl methacrylates, polyacrylamides and polyacrylonitriles, impact-modified with butyl acrylate.

9. Copolymers of the monomers mentioned under 9) with each other or with other unsaturated monomers, for example acrylonitrile/ butadiene copolymers, acrylonitrile/alkyl acrylate copolymers, acrylonitrile/ alkoxyalkyl acrylate or acrylonitrile/vinyl halide copolymers or acrylonitrile/alkyl methacrylate/butadiene terpolymers.

10. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
11. Polymers selected from the group consisting of the polyurethanes, polyamides, polyesters, polycarbonates and epoxy resins.
12. Blends of the aforementioned polymers (polyblends), typically PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

The graft reaction can be carried out with or without solvent. The catalysts used are radical formers such as those used for the homo- or copolymerisation of unsaturated compounds. It is preferred to use radical initiators which separate into radicals during heating, typically organic peroxides or hydroperoxides, azo compounds or redox catalysts. The graft polymerisation can also be initiated by energy-rich radiation.

Suitable reaction apparatus for carrying out the graft reaction are those conventionally used in the chemical industry, and grafting is preferably carried out in a kneader or extruder.

The processing conditions suitable for graft polymerisations are known to those skilled in the art.

Preferred graft polymers are those containing at least 1% by weight, preferably at least 2% by weight, of the N-pyrrolidinone-containing compounds in chemically bonded form.

The invention further relates to plastic compositions containing 0.5 to 50% by weight of at least one monomeric N-pyrrolidinone-containing compound of formula I or of a polymeric N-pyrrolidinone-containing compound, obtainable by a radically initiated graft polymerisation of a compound of formula I with an organic polymer. The preferences indicated for the use of the N-pyrrolidinone-containing compounds apply here analogously. Preferred plastic compositions are those containing 1 to 10% by weight of at least one monomeric N-pyrrolidinone-containing compound. Also preferred are plastic compositions containing, depending on the degree of grafting, 1 to 25% by weight of at least one polymeric N-pyrrolidinone-containing compound.

The novel compatibilisers can in principle be used in all incompatible plastic compositions. Said plastic compositions can consist of two or more than two components. The novel compatibilisers are preferably added to compositions of polar and nonpolar plastics.

The nonpolar components of plastic compositions are typically polyolefins such as polyethylene (PE) and polypropylene (PP). To be mentioned here in particular are low density polyethylene (LDPE), linear low density polyethylene (LLDPE) and high density polyethylene (HDPE), and also copolymers such as ethylene/propylene copolymers (EPM) and ethylene/propylene/diene copolymers (EPDM) as well as ULDPE and MDPE. Such nonpolar plastics also include polystyrene (PS, EPS) as well as copolymers with a styrene component (e.g. ABS, ASA, HIPS, IPS) and polyvinyl chloride (PVC), and also copolymers having a predominant component of vinyl chloride (e.g. CPE).

The polar components are typically polyester, e.g. polyethyleneterephthalate (PET) or PBT, polyamides or polycarbonates.

Mixtures of polyethylene and polypropylene, or polyethylene and polyamide, are particularly preferred.

The use of a N-pyrrolidinone-containing compound as compatibiliser for plastic compositions (as well as the plastic composition itself) also includes plastic compositions from scrap materials (recyclates), such as those coming from households and stores (e.g. supermarkets). Such recyclates mainly consist of packaging material. Said material may typically be films, bags, bottles and other containers, or foams. Other utensils may also be included. However, the recyclates also consist of mixtures of plastics predamaged by use, storage and processing. These materials typically come from useful material collections or obligatory returnable originating from, inter alia, the automotive industry, electro/electronic industry, building and agriculture as well as from the textile industry. In certain plastic wastes, minor amounts of foreign materials may also be present, such as paper, pigments and adhesives which are often difficult to remove. These foreign materials may also originate from contact with diverse substances during use or processing, typically fuel residues, paint components, printing inks, metal traces, initiator residues or also water traces.

The invention further relates to a process for enhancing the compatibility of plastic compositions by adding 0.5 to 50% by weight of at least one monomeric or polymeric N-pyrrolidinone-containing compound to the plastic composition, with the proviso that poly-N-vinylpyrrolidones are excluded. The preferences stated for the use of the N-pyrrolidinone-containing compounds and the plastic compositions apply here analogously.

The process, i.e. the incorporation/blending of the monomeric or polymeric N-pyrrolidinone-containing compound, can conveniently be carried out as follows:

as emulsion or dispersion;
as dry mixture during the blending of additional components or polymer mixtures;
by direct addition into the processing apparatus (e.g. calander, mixer, kneader, extruder and the like), or
as solution or melt.

The novel plastic compositions can be prepared in per se known manner by blending the compatibiliser and further optional additives with the plastic composition using per se known apparatus such as the above-mentioned processing apparatus. The further additives can be added singly or as a mixture, or also in the form of so-called masterbatches.

It is also possible to prepare the compatibiliser and the compatible plastic blend in one process step by adding a monomeric N-pyrrolidinone-containing compound and a radical initiator to the plastic blend direct during the processing of the blend, i.e. without prior separate preparation of the compatibiliser.

The plastic compositions of this invention can be brought into the desired shape by known methods. Such methods are, for example, grinding, calandering, extruding, injection moulding, sintering or spinning as well as extrusion blow moulding, or processing according to the plastisol process.

The optional further additives are mainly the conventional stabilisers of plastics processing and are known to the person skilled in the art. The further additives are used in the conventional amounts and combinations described in more detail in the relevant literature (e.g. "Plastics Additives", Gächter/Müller, Hanser Verlag, München/Wien/New York, 3rd edition) and typically include:
1. Antioxidants
1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-

4,6-di-methylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butyiphenol, 2,4-di-octylthiomethyl-6-methylphenol, 2,4-dioctylthiomethyl-6-ethylphenol, 2,6-di-dodecylthio-methyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Chroman derivatives of formula

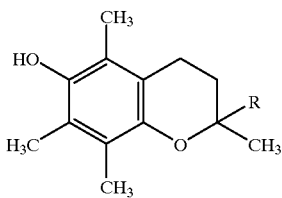

wherein R is —(CH$_2$)$_3$—CH(CH$_3$)—(CH$_2$)$_3$—CH(CH$_3$)—CH$_2$)$_3$—CH(CH$_3$)$_2$ or —CH$_2$—CH$_2$—O—C(O)—Z, and Z is C$_1$–C$_{18}$alkyl, —CH$_2$—CH$_2$—S—C$_1$—C$_{18}$alkyl or

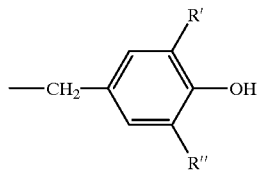

wherein R' or R" is H, CH$_3$ or tert-butyl; e.g. α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)di-cyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4 hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)-malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl) isocyanurate.

1.11. Benzylihosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

11.14. Esters of β-(5-tert-butyl-4-hydroxy-3-methylphenyl) propionic acid with mono- or polyhydric alcohols, e.g. with methanol, ethanol, octanol, octadecanol, 1,6-hexanediol, 1,9-nonanediol, ethylene glycol, 1,2- propanediol, neopentyl glycol, thiodiethylene glycol, diethylene glycol, triethylene glycol, pentaerythritol, tris(hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis (3,5-di-tert-butyl-4-hydroxyphenylpropionyl)-hydrazine.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazole-2-ylphenol]; the transesterifica tion product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl.

2.2. 2-Hydroxybenzophenone, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethylpiperidyl)sebacate, bis-(2,2,6,6-tetramethylpiperidyl)succinate, bis(1,2,2,6,6-pentamethylpiperidyl)sebacate, bis-(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpipedyl)-2-n-butyl-2-(2-hydroxy-3,5-di-tert-butylbenzyl) malonate, 3-n-octyl-7,7,9,9-tetramethyl-1,3,8-triazaspiro[4.5]-decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis(2,2,6,6-tetramethyl-4-piperidyl) hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxyanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1 3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy) phenyl]-4,6-bis(2,4-dimethyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenyl hydrazide, N,N'-diacetyladipoyl dihydrazide, N,N'-bis(salicyloyl)oxalyl dihydrazide, N,N'-bis(salicyloyl) thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methylphosphite, bis(2,4-di-tert-butyl-6-methylphenyl)ethyl phosphite.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

8. Nucleating agents, for example, 4-tert-butylbenzoic acid, adipic acid, diphenylacetic acid.

9. Fillers and reinforcing agents, for example, calcium carbonate, silicates, glass fibres, talc, kaolin, mica, barium sulfate, metal oxides and hydroxides, carbon black, graphite.

10. Other additives, for example, plasticisers, lubricants, emulsifiers, pigments, optical brighteners, flameproofing agents, antistatic agents and blowing agents.

11. Benzofuranones and indolinones, for example those disclosed in U.S. Pat. Nos. 4,325,863, 4,338,244, 5,175,312, 5,216,052, 5,252,643, DE-A-4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The following Examples further illustrate the invention. In the Examples as well as throughout the remainder of the description, parts and percentages are by weight, unless otherwise stated.

Preparation of the Compatibilisers

EXAMPLE 1

420 g (2.5 mol) of cinnamoyl chloride and 215 g (2.5 mol) of pyrrolidinone are dissolved in 2500 ml of anhydrous acetone under a nitrogen atmosphere and at 0° C. To this solution are added dropwise 275 g (2.7 mol) of triethylamine at 0–50°C. The mixture is then stirred for one hour at room temperature and for one hour at 55° C. Subsequently, the mixture is cooled to 10° C. and filtered, and the acetone is removed by distillation at 80° C., first under normal pressure and then under vacuum. The viscous product so obtained (yield: 531 g; 99% of theory) is recrystallised from hexane/isopropanol and then has a melting point of 95–960° C. (compound (101)). The IR spectrum and the NMR spectrum are in accordance with the following structure:

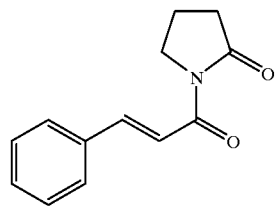

(101)

EXAMPLE 2

90 parts of LDPE (Lupolen 3026 F, supplied by BASF, DE) are kneaded for 15 min with 10 parts of compound (101) of Example 1 with the addition of 0.5 part of dicumylperoxide in an oil-heated mixing chamber at 200° C. and 46 rpm. The grafted LDPE (polymeric N-pyrrolidinone-containing compound (102)) so obtained is used for the following Use Examples.

EXAMPLE 3

360 g (3.67 mol) of maleic anhydride are added to 570 g (4.42 mol) of 1-(2-hydroxyethyl)pyrrolidone over 30 minutes under a nitrogen atmosphere at 100° C. During the reaction the temperature is kept at 110–120° C., and the mixture is then left standing for 4 hours at this temperature. After cooling the reaction mixture, the crystalline residue is taken up in 2 l of toluene and refluxed for one hour. The reaction mixture is cooled and filtered. The filtrate is concentrated on a vacuum rotary evaporator. The residue is dried under vacuum at 50° C., giving 820 g (98%) of the monoester of the maleic acid with 1-(2-hydroxyethyl) pyrrolidone (compound (103)) having the following structure:

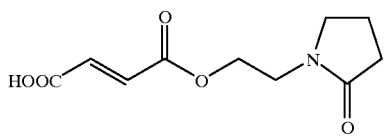

(103)

EXAMPLE 4

240 g of a 50% aqueous sodium hydroxide solution are added dropwise to a mixture of 387.5 g of 1-(2-hydroxyethyl)-2-pyrrolidone, 1387.5 g of epichlorohydrin and 8 g of a 50% aqueous solution of tetrabutylammonium chloride, refluxed at 50 to 55° C. and 70 torr. The water/ epichlorohydrin azeotrope is continuously distilled off during the dropwise addition of the NaOH solution. The reaction mixture is then subjected for a further 2 hours to the azeotropic distillation. The reaction mixture is then cooled and filtered, and the filtrate is adjusted to pH 5–6 with glacial acetic acid. The filtrate, containing excess epichlorohydrin, is concentrated on a vacuum rotary evaporator below 120° C. The residue is distilled at 175–180° C./10 mm Hg, resulting in 454 g (82%) of the N-pyrrolidone derivative (compound (104)) having the following structure:

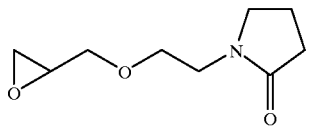

(104)

EXAMPLE 5

In general accordance with the procedure of Example 2, 95 parts of LDPE (Lupolen 3026 F, supplied by BASF, DE) are kneaded for 15 min with 5 parts of compound (101) of Example 1 with the addition of 0.25 part of dicumylperoxide in an oil-heated mixing chamber at 200° C. and 46 rpm. The grafted LDPE (polymeric N-pyrrolidinone-containing compound (105)) so obtained is used for the following Use Examples.

EXAMPLE 6

In general accordance with the procedure of Example 2, 90 parts of LDPE (Lupolen 3026 F. supplied by BASF, DE) are kneaded for 15 min with 10 parts of compound (103) of Example 3 with the addition of 0.5 part of dicumylperoxide in an oil-heated mixing chamber at 200° C. and 46 rpm. The grafted LDPE (polymeric N-pyrrolidinone-containing compound (106)) so obtained is used for the following Use Examples.

EXAMPLE 7

In general accordance with the procedure of Example 2, 90 parts of LDPE (Lupolen 3026 F, supplied by BASF, DE) are kneaded for 15 min with 10 parts of compound (104) of Example 4 with the addition of 0.5 part of dicumylperoxide in an oil-heated mixing chamber at 200° C. and 46 rpm. The grafted LDPE (polymeric N-pyrrolidinone-containing compound (107)) so obtained is used for the following Use Examples.

Use Examples

EXAMPLE 8

A mixture of polyamide 6 (Ultramid B 35, supplied by BASF, DE) and LDPE (Lupolen 3026 F, supplied by BASF, DE) is extruded with compound (102) [Example 2, compatibiliser] in a twin screw extruder (Haake Rheocord 90) at 2100C. In an injection moulding machine, test samples are prepared from the granulate so obtained at 240° C., and the tensile impact strength is determined according to DIN 53448 (Table 1).

TABLE 1

| Example | PA 6 (parts) | LDPE (parts) | Compatibiliser (parts) | Tensile impact strength [kJ/m$^2$] |
| --- | --- | --- | --- | --- |
| Example 8a | 30 | 70 | — | 220 |
| Example 8b | 30 | 65 | 5 | 530 |
| Example 8c | 30 | 50 | 20 | 560 |

What is claimed is:

1. A plastic composition comprising at least two different thermoplastic polymers which contains 0.5 to 50% by weight of at least one monomeric N-pyrrolidinone-containing compound of the formula I

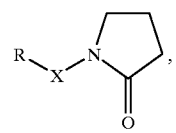

(I)

wherein
X is —OCH$_2$CH$_2$—, where the carbon atom is bound to the nitrogen,
R is

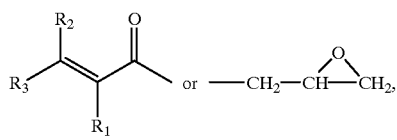

$R_1$ is hydrogen, $C_1$–$C_{18}$alkyl, $C_6$–$C_{14}$aryl, $C_6$–$C_{13}$aryl which is substituted by 1 to 3 phenyl or $C_1$–$C_{18}$ alkyl groups; $C_5$–$C_7$cycloalkyl, or $C_5$–$C_7$cycloalkyl which is substituted by 1 to 3 $C_1$–$C_{18}$alkyl groups, $R_2$ is hydrogen, $C_1$–$C_{18}$alkyl, $C_6$–$C_{14}$aryl, $C_6$–$C_{13}$aryl which is substituted by 1 to 3 phenyl or $C_1$–$C_{18}$alkyl groups; $C_5$–$C_7$cycloalkyl, or $C_5$–$C_7$cycloalkyl which is substituted by 1 to 3 $C_1$–$C_{18}$alkyl groups; and $R_3$ is hydrogen, $C_1$–$C_{18}$alkyl, $C_6$–$C_{14}$aryl, —COOH, C6–$C_{13}$aryl which is substituted by 1 to 3 phenyl or $C_1$–$C_{18}$alkyl groups; $C_5$–$C_7$cycloalkyl, or $C_5$–$C_7$cycloalkyl which is substituted by 1 to 3 $C_1$–$C_{18}$alkyl groups.

2. A plastic composition according to claim 1, which is a mixture of polyethylene and polypropylene or polyethylene and polyamide.

3. A plastic composition according to claim 1, wherein the plastic composition is a recyclate.

4. A process for improving the compatibility of plastic compositions of at least two different thermoplastic polymers, which process comprises adding to the plastic composition 0.5 to 50% by weight of at least one monomeric N-pyrrolidinone-containing compound of formula I

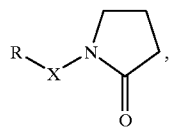 (I)

wherein

X is —OCH$_2$CH$_2$—, where the carbon atom is bound to the nitrogen,

R is

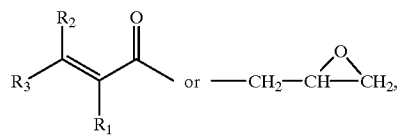

R$_1$ is hydrogen, C$_1$–C$_{18}$alkyl, C$_6$–C$_{14}$aryl, C$_6$–C$_{13}$aryl which is substituted by 1 to 3 phenyl or C$_1$–C$_{18}$alkyl groups; C$_5$–C$_7$cycloalkyl, or C$_5$–C$_7$cycloalkyl which is substituted by 1 to 3 C$_1$–C$_{18}$alkyl groups, R$_2$ is hydrogen, C$_1$–C$_{18}$alkyl, C$_6$–C$_{14}$aryl, C$_6$–C$_{13}$aryl which is substituted by 1 to 3 phenyl or C$_1$–C$_{18}$alkyl groups; C$_5$–C$_7$cycloalkyl, or C$_5$–C$_7$cycloalkyl which is substituted by 1 to 3 C$_1$–C$_{18}$–alkyl groups, and R$_3$ is hydrogen, C$_1$–C$_{18}$alkyl, C$_6$–C$_{14}$aryl, —COOH, C$_6$–C$_{13}$aryl which is substituted by 1 to 3 phenyl or C$_1$–C$_{18}$alkyl groups; C$_5$–C$_7$cycloalkyl, or C$_5$–C$_7$cycloalkyl which is substituted by 1 to 3 C$_1$–C$_{18}$alkyl groups.

5. A process for improving the compatibility of plastic compositions according to claim 4, wherein R$_1$ and R$_2$ are hydrogen.

6. A process for improving the compatibility of plastic compositions according to claim 4, which comprises adding to the plastic composition said monomeric N-pyrrolidinone-containing compound and a radical initiator directly during the processing of the composition.

7. A plastic composition according to claim 1, wherein R$_1$ and R$_2$ are hydrogen.

8. A plastic composition according to claim 1 wherein R$_3$ is —COOH or phenyl which is unsubstituted or substituted by one C$_1$–C$_{12}$alkyl radical or phenyl radical.

9. A plastic composition according to claim 1 wherein R$_1$ and R$_2$ are hydrogen and R$_3$ is —COOH or phenyl which is unsubstituted or substituted by one C$_1$–C$_{12}$alkyl radical or phenyl radical.

10. A plastic composition according to claim 1 wherein R is

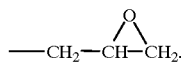

11. A plastic composition according to claim 1 wherein R is

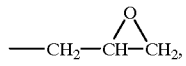

R$_1$ and R$_2$ are hydrogen and R$_3$ is —COOH or phenyl which is unsubstituted or substituted by one C$_1$–C$_{12}$alkyl radical or phenyl radical.

12. A plastic composition according to claim 1 wherein R is

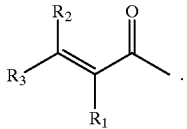

13. A process for improving the compatibility of plastic compositions according to claim 4 wherein R$_3$ is —COOH or phenyl which is unsubstituted or substituted by one C$_1$–C$_{12}$alkyl radical or phenyl radical.

14. A process for improving the compatibility of plastic compositions according to claim 4 wherein R$_1$ and R$_2$ are hydrogen and R$_3$ is —COOH or phenyl which is unsubstituted or substituted by one C$_1$–C$_{12}$alkyl radical or phenyl radical.

15. A process for improving the compatibility of plastic compositions according to claim 4 wherein R is

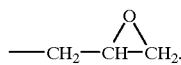

16. A process for improving the compatibility of plastic compositions according to claim 4 wherein R is

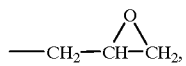

R$_1$ and R$_2$ are hydrogen and R$_3$ is —COOH or phenyl which is unsubstituted or substituted by one C$_1$–C$_{12}$alkyl radical or phenyl radical.

17. A process for improving the compatibility of plastic compositions according to claim 4 wherein R is

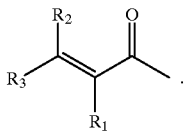

* * * * *